US010196282B2

(12) United States Patent
Boudreau et al.

(10) Patent No.: US 10,196,282 B2
(45) Date of Patent: *Feb. 5, 2019

(54) FILTER CARTRIDGES FOR JUG CONTAINER

(71) Applicant: KX Technologies LLC, West Haven, CT (US)

(72) Inventors: Kelly Boudreau, Lake Elmo, MN (US); Keith D. Johnson, Woodbury, MN (US); Michael J. Sherman, Woodbury, MN (US); Frank A. Brigano, Northford, CT (US); Richard A. Kirchner, Apple Valley, MN (US); Paul A. Pilosi, Minnetonka, MN (US); Jason J. Ness, Victoria, MN (US)

(73) Assignee: KX Technologies LLC, West Haven, CT (US)

(*) Notice: Subject to any disclaimer, the term of this patent is extended or adjusted under 35 U.S.C. 154(b) by 501 days.

This patent is subject to a terminal disclaimer.

(21) Appl. No.: 14/610,373

(22) Filed: Jan. 30, 2015

(65) Prior Publication Data

US 2015/0246824 A1    Sep. 3, 2015

Related U.S. Application Data

(60) Provisional application No. 61/947,182, filed on Mar. 3, 2014.

(51) Int. Cl.
*C02F 1/00* (2006.01)
*C02F 1/28* (2006.01)

(52) U.S. Cl.
CPC .............. *C02F 1/003* (2013.01); *C02F 1/283* (2013.01); *C02F 1/286* (2013.01); *C02F 2307/04* (2013.01)

(58) Field of Classification Search
None
See application file for complete search history.

(56) References Cited

U.S. PATENT DOCUMENTS

| | | | |
|---|---|---|---|
| 2,933,188 A | 4/1960 | Jacula | |
| 3,392,837 A | 7/1968 | Sanzenbacher | |
| 3,556,350 A * | 1/1971 | Hanley | F25D 31/002 222/608 |
| 4,181,243 A * | 1/1980 | Frahm | B67D 3/00 137/550 |
| 4,491,520 A * | 1/1985 | Jaye | C02F 1/002 210/232 |
| 5,486,285 A * | 1/1996 | Feeney | B67D 3/00 137/453 |

(Continued)

FOREIGN PATENT DOCUMENTS

| | | |
|---|---|---|
| CN | 103672163 A | 3/2014 |
| EP | 0404573 A2 | 12/1990 |

(Continued)

*Primary Examiner* — Patrick J Orme
(74) *Attorney, Agent, or Firm* — DeLio, Peterson & Curcio, LLC; Robert Curcio

(57) ABSTRACT

Filter cartridge designs for use in conjunction with valves of the faucet or spigot type for withdrawing liquids at relatively low pressures from containers such as gravity feed jugs, ice chests, coolers, collapsible travel bags, and the like, wherein the filter cartridge housings have various shapes and attachment schemes to the spigot subassembly.

23 Claims, 18 Drawing Sheets

(56) References Cited

U.S. PATENT DOCUMENTS

| | | |
|---|---|---|
| 5,919,365 A | 7/1999 | Collette |
| 6,193,886 B1 | 2/2001 | Nohren, Jr. |
| 6,541,055 B1 | 4/2003 | Luzenberg |
| 6,569,329 B1 | 5/2003 | Nohren, Jr. |
| 7,655,112 B2 * | 2/2010 | Koslow ................. A61L 2/0017 162/157.6 |
| D686,296 S | 7/2013 | Melzer |
| 2005/0072728 A1 | 4/2005 | Chang |
| 2008/0164223 A1 * | 7/2008 | Wilson .................... C02F 1/003 210/780 |
| 2011/0284585 A1 | 11/2011 | Stewart-Barnett |
| 2013/0118972 A1 | 5/2013 | Yui |
| 2013/0213877 A1 | 8/2013 | Lin et al. |
| 2013/0233890 A1 | 9/2013 | Melzer |

FOREIGN PATENT DOCUMENTS

| | | | |
|---|---|---|---|
| EP | 0861809 | 4/1995 | |
| EP | 1028090 | 1/2000 | |
| EP | 1321428 | 12/2002 | |
| GB | 2501822 A * | 11/2013 | ............. B01D 63/04 |
| GB | 2504501 | 2/2014 | |
| GB | 2504501 A * | 2/2014 | ............. C02F 1/003 |
| WO | WO 1998 005401 | 2/1998 | |
| WO | WO 1998 032705 | 7/1998 | |
| WO | WO 2012 130329 | 10/2012 | |

* cited by examiner

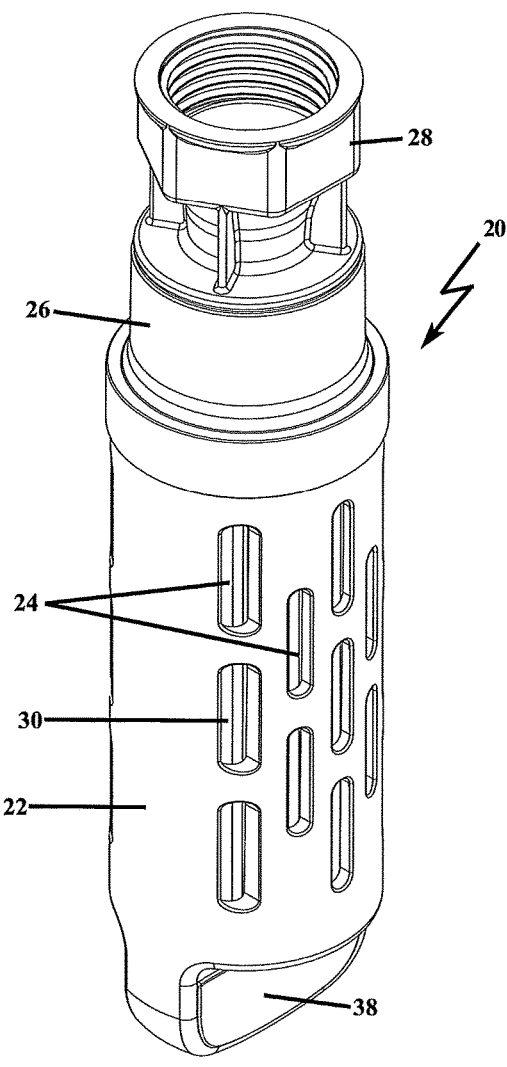 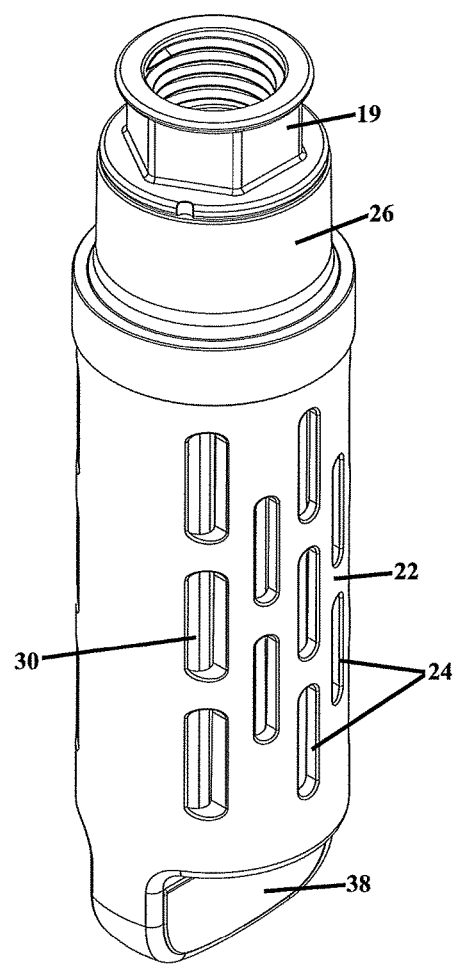
FIG. 2A  FIG. 2C

FILTER CARTRIDGES FOR JUG CONTAINER

BACKGROUND OF THE INVENTION

1. Field of the Invention

The present invention relates generally to filters for use in conjunction with valves of the faucet or spigot type, and particularly to filters for use in devices for withdrawing liquids from containers at relatively low pressures, such as gravity feed jugs, ice chests, collapsible travel bags, or coolers, and the like.

2. Description of Related Art

Since a jug may provide a source of readily accessible drinking water, the purity of the water dispensed from it is of major concern. The need to have the jug serve as a reliable source of drinkable water becomes important to the large group of users drinking from the jug, or when the water is obtained from a questionable source.

Filtered water filter containers, such as jugs or pitchers, generally comprise a receptacle and a removable hopper, which the hopper can be supported in or on the receptacle. The hopper is adapted to carry a water filter cartridge which typically comprises a molded container having inlet and outlet slots formed therein to allow water to enter and exit an internal cavity.

Most water filter containers, such as countertop pitchers, include a divider that separates the jug into two compartments. The divider is generally adapted to carry a water treatment device, such as a filter cartridge. The divider is typically positioned in use so that it divides the container into an upper compartment and a lower compartment. Water filter pitchers of this type have been available in the art. For example, WIPO Publication WO 1998005401 of Robinson, et al., titled "A Water Treatment Cartridge and a Water Filter Jug Fitted with such a Cartridge," teaches a water filter pitcher with a divider. In this prior art design, the spout has a fluid outlet in fluid communication with the lower compartment, which is the compartment with the filtered water.

In U.S. Pat. No. 4,181,243 issued to Frahm on Jan. 1, 1980, titled "Device for Filtering Beverages," a filter element is provided at the inlet of a spigot for dispensing beverages from a reservoir or cooler. The filter receiving member or holder is an open, cup-shaped member which is threaded to the inlet shaft of the spigot to act as a fastener for mounting the spigot to the reservoir. The filter element is then inserted into the filter holder by a push fit, and removed therefrom by pulling it out of the cup-shaped member. In this design, however, the filter cartridge is relatively small, and it would have to be even smaller if it were adapted to a water jug, where the outlet tap is located as near as possible to the bottom portion of the container, since the radius of the cup-shaped holder would have to be a little smaller than the distance from the center of the tubular faucet stem to the bottom wall.

In U.S. Pat. No. 4,491,520 issued to Jaye on Jan. 1, 1985, titled "Filter For Water Jugs," a filter for a conventional water jug is taught having a valve tap near the bottom of its cylindrical side wall, in a pan-like case member that seats in the bottom of the jug, with a filter cartridge removably sealed across its open top. Confined between a nut and the inner surface of the jug side wall are a rigid washer and a resilient annular gasket that cooperate with the nut to seal a faucet to the side wall. The washer, which lies adjacent to the nut, is of larger diameter than the nut and thus defines an annular shoulder that faces into the interior of the jug and beyond which the threaded inner end portion of the faucet stem projects inward relative to the jug. The case member has a substantially flat bottom case wall and a low side case wall that projects up from the bottom case wall. The side case wall has at its upper edge a radially outwardly projecting flange that extends completely around it and lies in a single plane, for supporting the filter cartridge and forming a seal to it. The outside diameter of the case member is such that it is receivable within the interior of the jug with a small clearance from its side wall.

In these prior art designs, the filtering mechanism is attached to a spigot, and designed specifically for granular filter media, which limits the ability to incorporate novel filter housings and diverse filter media within a jug container, ice chest, cooler, and the like.

Furthermore, the design and attachment of a filter cartridge housing within these types of containers that would accommodate an existing spigot and gasket design has not been explored or developed in the prior art.

SUMMARY OF THE INVENTION

Bearing in mind the problems and deficiencies of the prior art, it is therefore an object of the present invention to provide novel means for filtering beverages as they are dispensed through a jug container, cooler, spigoted vessel, ice chest, collapsible travel bags, and the like, for consumption.

It is another object of the present invention to provide an improved filter mechanism and filter element for use in jug-type containers, coolers, spigoted vessels, ice chests, collapsible travel bags, and the like, whereby the filter element is easily insertable in and detachable from the remainder of the assembly for quick replacement.

A further object of the present invention is to provide a filter mechanism which also functions as a fastener for mounting a dispensing valve or spigot to a reservoir.

It is yet another object of the present invention to provide a novel filter element so arranged in a jug or cooler that all water flowing to the outlet tap at the bottom of the jug must pass through the filter unit.

The above and other objects, which will be apparent to those skilled in the art, are achieved in the present invention which is directed to a filter assembly for a container comprising: a fluid dispensing spigot having a portion located on the outside of the container, and a portion extending therethrough, such that the spigot is in fluid communication with fluid within the container; and a filter housing having a filter media enclosed therein, a body portion and a housing egress end, the egress end forming a fluid-tight seal with the spigot, the body portion in fluid communication with the housing egress end and having a plurality of apertures for fluid ingress to the filter media.

The spigot includes an extension extending into the container. The housing egress end forms the fluid-tight seal with the spigot extension by a threaded fit, press fit, snap fit, or friction fit.

The container is preferably a jug having an inner cavity, and the filter housing is located within the inner cavity and connected to the spigot extension in a fluid tight seal.

The filter media may include pleated paper of fibrillated fibers, and the fibrillated fibers may comprise fibrillated adsorbent cellulose technology. The filter media may include extruded carbon.

An adapter may be used for connecting the housing egress end to the spigot extension. The adapter preferably includes a threaded interface for making a fluid tight attachment of the adapter to the spigot extension. Other interfaces may include a press fit or friction fit interface for making a fluid tight attachment of the adapter to the housing egress end.

The filter housing is preferably of a predominantly cylindrical shape.

In a second embodiment, the present invention is directed to a filter assembly for a container comprising: a fluid dispensing spigot having a portion located on the outside of the container; an extension member connected to or integral with the spigot, and extending into the container such that the spigot is in fluid communication with fluid within the container; and a filter housing assembly having an angled neck portion and a base portion, the angled neck portion forming a fluid-tight seal with the spigot extension, the base portion in fluid communication with the neck portion, and having a plurality of apertures for fluid ingress to filter media enclosed within the filter housing. The angled neck portion forms an angle with the base portion and the spigot extension within a range of 0° to 90°.

In a third embodiment, the present invention is directed to a filter assembly for a container having a predetermined inside cavity shape, the container comprising: a fluid dispensing spigot having a portion located on the outside of the container; an extension member connecting to or integral with the spigot, extending into the container, such that the spigot is in fluid communication with fluid within the container; and a filter housing assembly having a base portion with a circumferential shape approximately the same as the inside cavity shape, and a filter cartridge removably insertable within the base portion, the base portion having a predominately flat surface extending circumferentially about an inner liner of the container, and forming a fluid-tight seal with the inner liner, such that unfiltered fluid remains above the base portion and can only enter below the base portion through the filter cartridge.

The removable filter cartridge preferably includes a removable top cover for accessing filter media. The removable top cover physically connects to the filter media, such that when the top cover is removed from the base portion, the filter media is removed concurrently therewith.

The inside cavity shape and the filter housing assembly may each have a circular circumference.

In a fourth embodiment, the present invention is directed to a filter assembly for a container comprising: a removable fluid dispensing spigot located on the outside of the container; an extension member connecting to or integral with the spigot, extending into the container, such that the spigot is in fluid communication with fluid within the container; and a filter housing assembly having a base enclosing filter media, the base in fluid communication with the spigot through a flexible extension allowing the filter media to be located a distance from the spigot, the base forming a housing for the filter media and having a plurality of apertures for fluid ingress to the filter media.

The filter housing assembly includes a neck portion the base, the neck portion forming a fluid-tight seal with the flexible extension, the base in fluid communication with the neck portion, and having a cylindrical shape.

In a fifth embodiment, the present invention is directed to a filter assembly for a container comprising: a fluid dispensing spigot in combination with a cassette filter housing assembly located on the outside of the container, the combination having an extension into the container, such that the spigot and the cassette filter housing assembly are in fluid communication with fluid within the container.

The cassette filter housing includes a slideably removable filter cartridge.

In an alternative embodiment, the cassette filter housing may include a securable cover plate for removing and replacing the filter cartridge, and the cover plate is hinged on one side and secured at an opposite or adjacent side.

In a sixth embodiment, the present invention is directed to a fluid dispenser comprising: a container for holding fluid; a release valve for dispensing fluid from the container; a filter cartridge within the container in fluid communication with the release valve and the fluid within the container, the filter cartridge having a filter media, and connected to the release valve via a fluid tight seal such that fluid within the container is filtered by the filter cartridge filter media prior to dispensing fluid from the container through the release valve.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2A depicts a side perspective view of a first embodiment of a filter cartridge housing assembly that is attachable to a spigot, which in a first embodiment, the filter cartridge housing assembly having a cylindrical body for enclosing a filter media;

FIG. 2C depicts the filter cartridge assembly of FIGS. 2A and 2B with a shortened or smaller adapter for mating with a different spigot configuration;

DESCRIPTION OF THE PREFERRED EMBODIMENT(S)

In describing the preferred embodiment of the present invention, reference will be made herein to FIGS. 1-14 of the drawings in which like numerals refer to like features of the invention.

The present invention relates to a standalone point of use water purification device, specifically a jug container, spigoted vessel, ice chest, collapsible travel bag, cooler, and the like, having a filtration unit for filtering fluid therefrom. The filtration unit is designed to remove heavy metals, viruses, microbiological contaminants, and volatile organic compounds, and the like, from fluid such as tap water, and melted ice, so that users may safely dispense drinkable fluid held in large container bodies that tend to utilize a spigot valve action.

Figure 1:
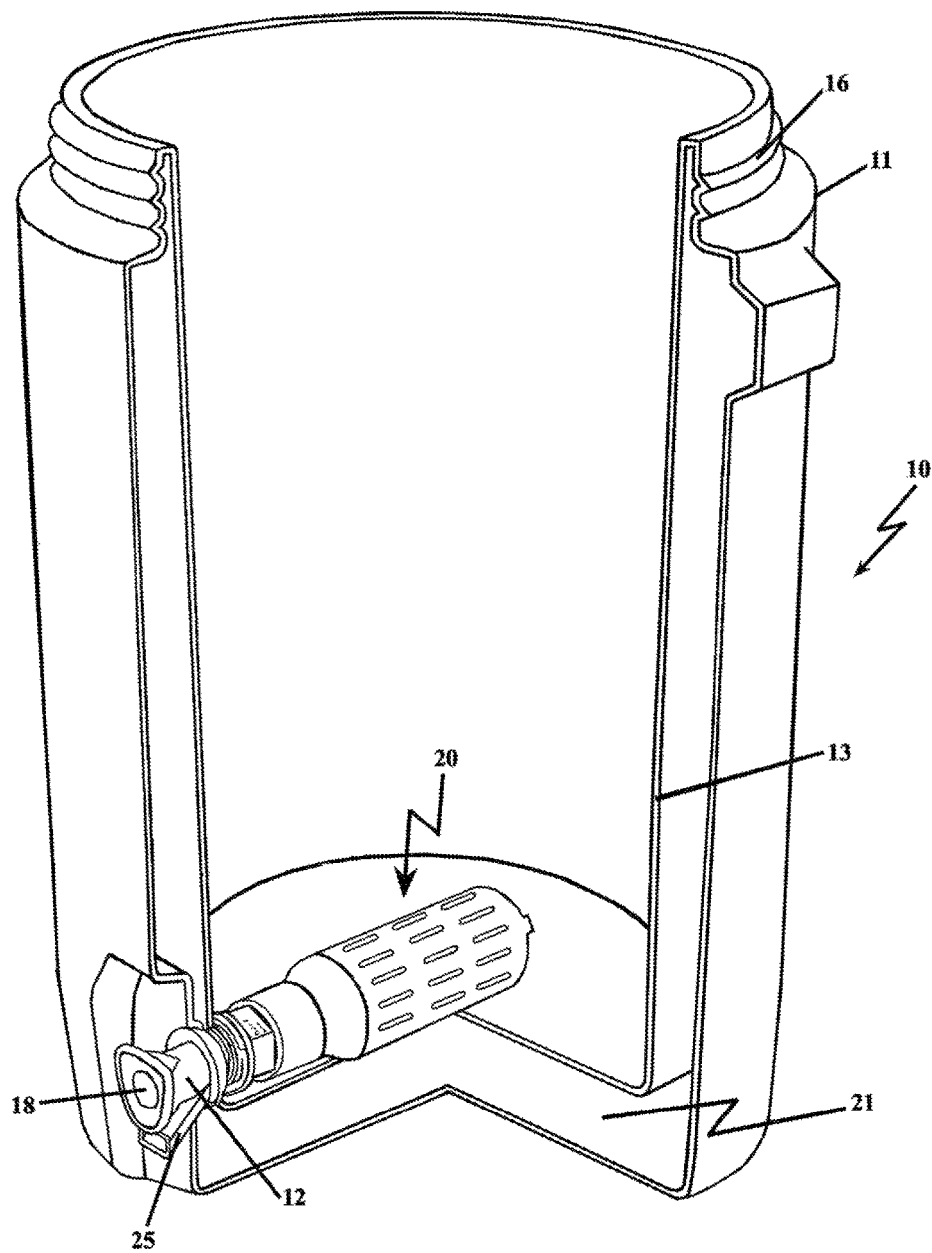
FIG. 1 depicts a cutout sectional view of a jug for containing and dispensing drinkable fluid having a spigot attachable filter housing assembly.

FIG. 1 depicts a cutout sectional view of a jug 10 for containing and dispensing drinkable fluid, such as water. Jug 10 includes a fluid-tight outer wall 11 having a sealingly removable cover or top (not shown) for fluid ingress, and a fluid dispensing spigot or spout 12 generally having an extended portion 14 passing through the outer wall 11 and inner wall or liner 13; spigot 12 being in fluid communication with the fluid in jug 10. Jug 10 may be cylindrical, as shown in FIG. 1, or generally rectangular in shape, although other shapes are not precluded. Jug 10 is designed generally to insulate the fluid inside from external temperature effects, and insulators, such as air gap 21, achieves this insulation function. The fluid enters the jug body by removing the cover or top, in at least one instance from a threaded attachment 16 and pouring fluid into the jug body, and exits via spigot 12 upon activation of a valve in the spigot. In at least one embodiment, spigot activation is achieved by depressing a button 18, which opens a valve within spigot 12, and allows fluid to flow from jug 10 through exit or flow tube 25. The spigot valve retains a leak proof seal when closed.

FIG. 2A depicts a side perspective view of one embodiment of a filter cartridge assembly 20 that is attachable to spigot 12. Filter cartridge assembly 20 includes a cartridge body 22 having a plurality of apertures 24 for fluid ingress. Apertures 24 are shown here as elongated ovals, however, the shape is arbitrary. The apertures may be any shape (circular, rectangular, etc.) provided there are sufficient openings) for fluid ingress within cylindrical body 22, the apertures being preferably designed for optimum fluid flow through the filter media. Apertures 24 are axially placed along the outer surface to allow fluid to enter and come in contact with the entire filter media secured therein.

In this exemplary embodiment, cartridge body 22 is cylindrical in shape, although other shapes are not precluded, and the invention incorporates other cartridge body shapes herein as preferred embodiments. Cartridge body 22 includes a narrow neck portion 26 that reduces the outer diameter of the cylindrical body housing ultimately for attachment to spigot 12. An extended adapter 28 is shown attached to neck portion 26 for securing to an extension on the spigot that protrudes through the jug wall and liner 13. Extended adapter 28 may be integrally formed with the neck portion 26, or as shown here, removably attachable to both neck portion 26 and spigot 12. In this embodiment, extended adapter 28 is threadedly attached to the spigot extension; however, other attachment schemes are available and not precluded, such as snap fit, friction fit, compress fit, and the like, provide the attachment scheme is fluid tight.

Figure 2B:
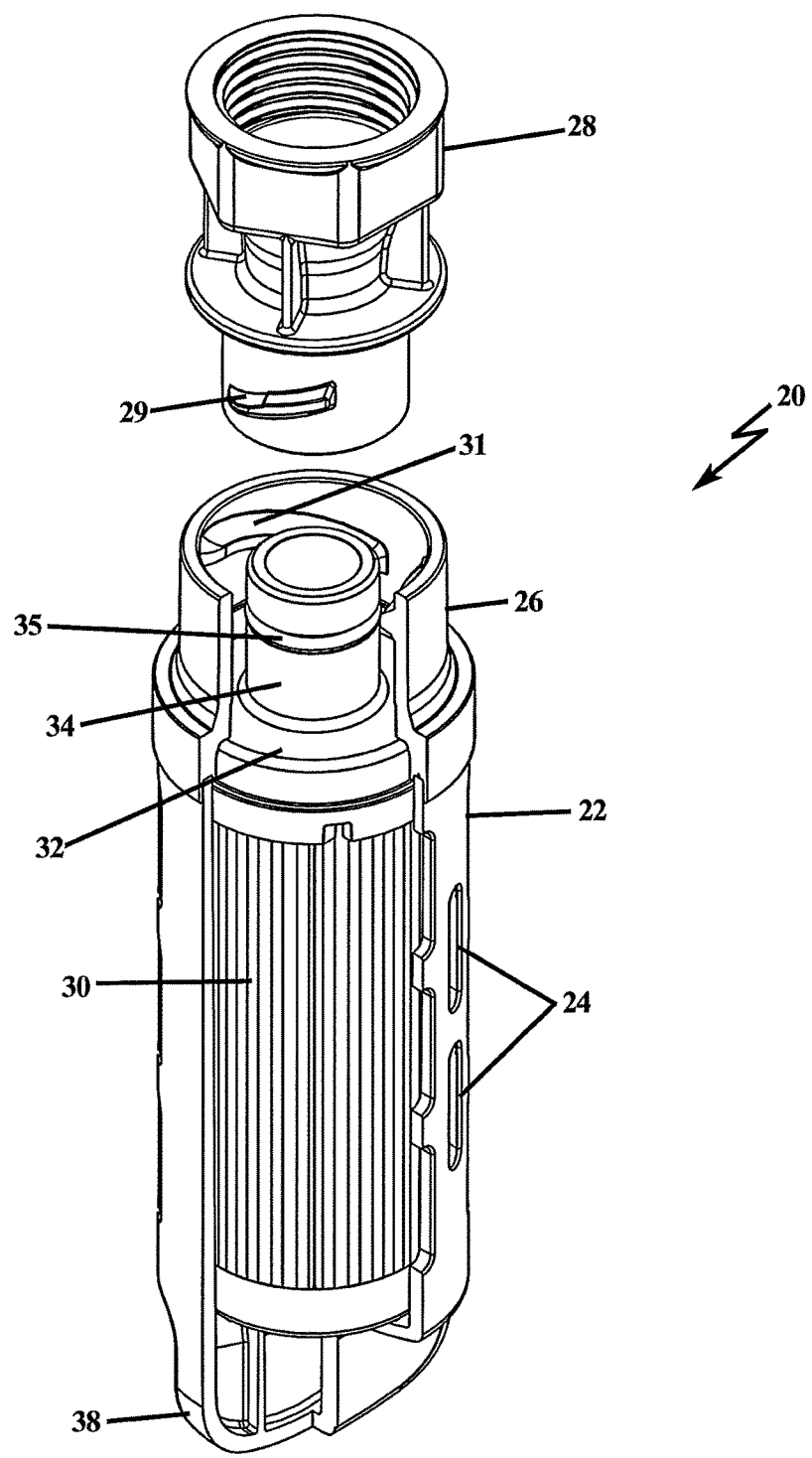
FIG. 2B depicts a cutaway view of a cylindrical filter cartridge housing of FIG. 2A depicting the filter media enclosed therein.

FIG. 2B depicts a cutaway view of the filter cartridge assembly 20 depicting a filter media 30 enclosed therein. In the preferred embodiment for a filter media design, filter media 30 is depicted with a pleated paper core having a filter media cap 32 secured to the pleated paper top surface. In other embodiments, filter media 30 may include an extruded carbon block, granulated activated carbon, or any combination thereof. Filter media cap 32 includes an extension 34 for removable sealing attachment to either extended adapter 28 or directly to spigot 12 (not shown) if an adapter is not used. Filter media cap extension 34 is shown with a groove 35 in the upper portion proximate the egress end for placement of a seal, such as an O-ring seal, for fluid tight interaction with the inner side wall of adapter 28. In this embodiment, adapter 28 is threadedly secured to the inside wall of neck portion 26 with diametrically opposed protrusions 29 angled in a direction that secures adapter 28 during rotation to complimentary protrusions 31 on neck portion 26; however, other attachment mechanisms are not precluded, including snap fit, friction fit, or other fluid tight constructions using seals. The opposite end of filter cartridge housing 20 includes a flange 38 to facilitate grasping and turning the filter cartridge assembly into place within the jug container. This is especially useful when filter cartridge housing 20 and adapter 28 are threadedly connected to the extension portion 14 of spigot 12. Flange 38 is depicted as a flat, hemispherical tab for grasping by hand; however, other shapes are not precluded provided the function of grasping and rotating the filter cartridge assembly into place is not adversely affected. The flat or face portion of flange 38 may be used to provide for identification purposes such as name brand recognition or other salient markings. The markings may be provided by an adhesive label or may be formed during the molding process of the filter cartridge housing.

FIG. 2C depicts the filter cartridge assembly 20 with a shortened or smaller adapter 19 for mating with a different spigot configuration. Other adapter shapes and sizes may be utilized for attachment with diverse spigot designs.

Figure 3:
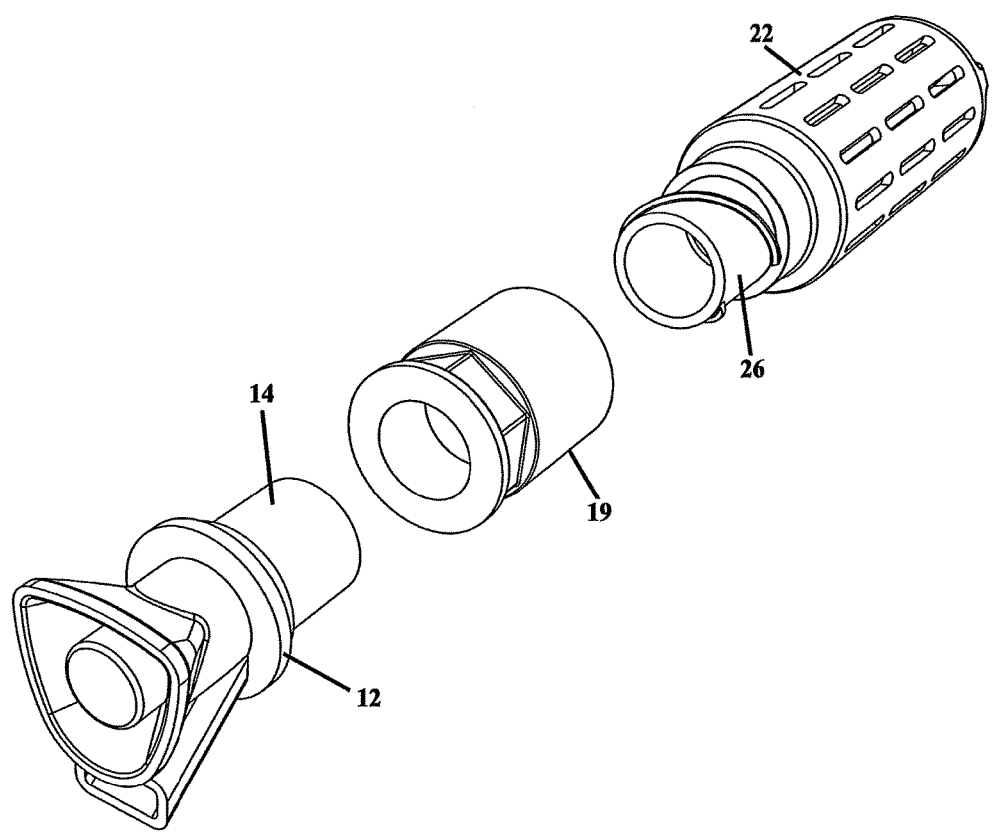
FIG. 3 depicts an exploded view of the filter cartridge assembly of FIGS. 2A and 2B with the spigot.

FIG. 3 depicts an exploded view of the filter cartridge assembly 20 of this first embodiment with spigot 12. Filter cartridge body 22 attaches via shortened adapter 19 to spigot 12 at spigot extension portion 14. In this manner, spigot 12 is sealingly engaged to adapter 19. The engagement of adapter 19 to spigot extension portion 14 must be a fluid tight seal to ensure unfiltered fluid does not enter the egress line of the spigot without first being filtered. This fluid tight seal may be employed as a threaded engagement or other form of sealing junction, such as a friction fit, snap fit, press fit, etc., provided a fluid tight function is achieved. Each adapter is designed to attach in a fluid tight matter to spigot extension portion 14. Various spigot designs will require different attachment schemes, and the flexibility of the present design to accommodate different adapters provides for diverse jug applications.

Figure 4:
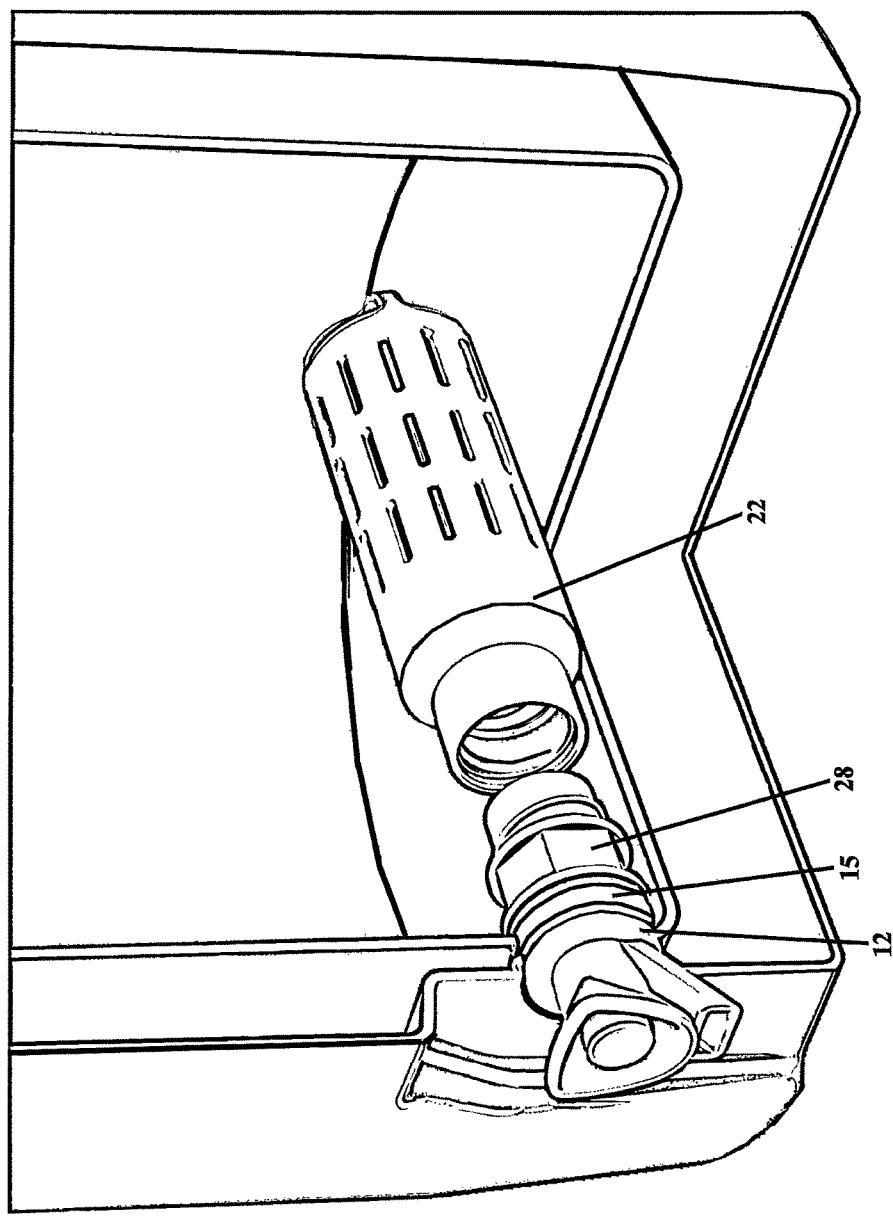
FIG. 4 depicts an exploded view of filter cartridge assembly of FIGS. 2A and 2B with the spigot sealingly attached to the jug liner by a fluid tight seal.

FIG. 4 depicts an exploded view of filter cartridge assembly 20 with spigot 12 sealingly attached to liner 13 by a gasket 15, for example an O-ring seal. Adapter 28 is preferably threadedly attached to spigot extended portion 14, and when attached, serves to compress gasket 15 against the liner 13 wall.

Once the adapter/spigot combination is secured to the liner wall, cartridge body 22 may be rotatably inserted on to the adapter 19, 28. Conversely, the adapter may first be attached to the cartridge body and then the combination rotatably inserted to spigot extended portion 14. The former combination for attachment is an easier method for attaching the adapter to the spigot extended portion if the adapter-spigot extended portion mating comprises a multiple thread design.

Figure 5:
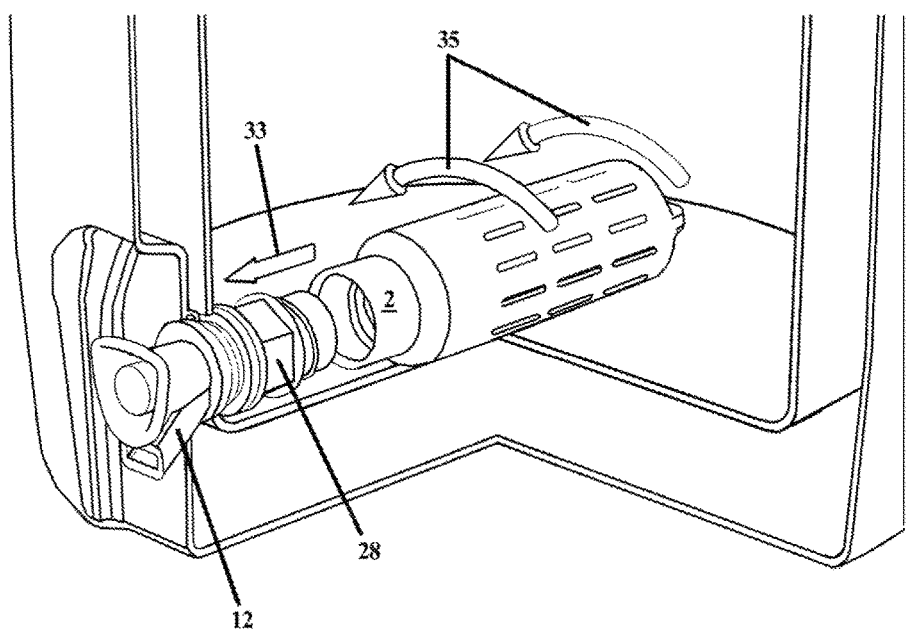
FIG. 5 depicts the insertion direction and rotational direction for attaching the cartridge body of the filter cartridge assembly of FIGS. 2A and 2B to a secured adapter/spigot combination.

FIG. 5 depicts the insertion direction and rotational direction for attaching cartridge body 22 to the secured adapter/spigot combination. Arrow 33 indicates the insertion direction, and arrows 35 indicate the rotation direction.

As depicted in the first embodiment, filter cartridge body 22 is preferably a cylindrically shaped structure. If filter media 30 is in the form of paper, preferably the paper employs fibrillated adsorbent cellulose technology (FACT®) produced by KX Technologies, LLC of West Haven, Conn., although other filter media may be utilized, and the present invention is not precluded from incorporating different filter media designed to target various contaminants and/or diseases.

Depending upon the positioning of spigot 12 at the bottom portion of the inside container, filter housing assembly 20 may be sufficiently elevated so that attachment to the spigot threaded connector can be achieved by simply rotating filter housing assembly 20 into place on threaded engagement of spigot extended portion 14. Conversely, if the positioning of spigot 12 is too close to the bottom portion of the inside container, it may be necessary to employ a different filter housing shape, as will be shown in a separate embodiment herein, or to employ a rotatable spigot.

Figure 6:
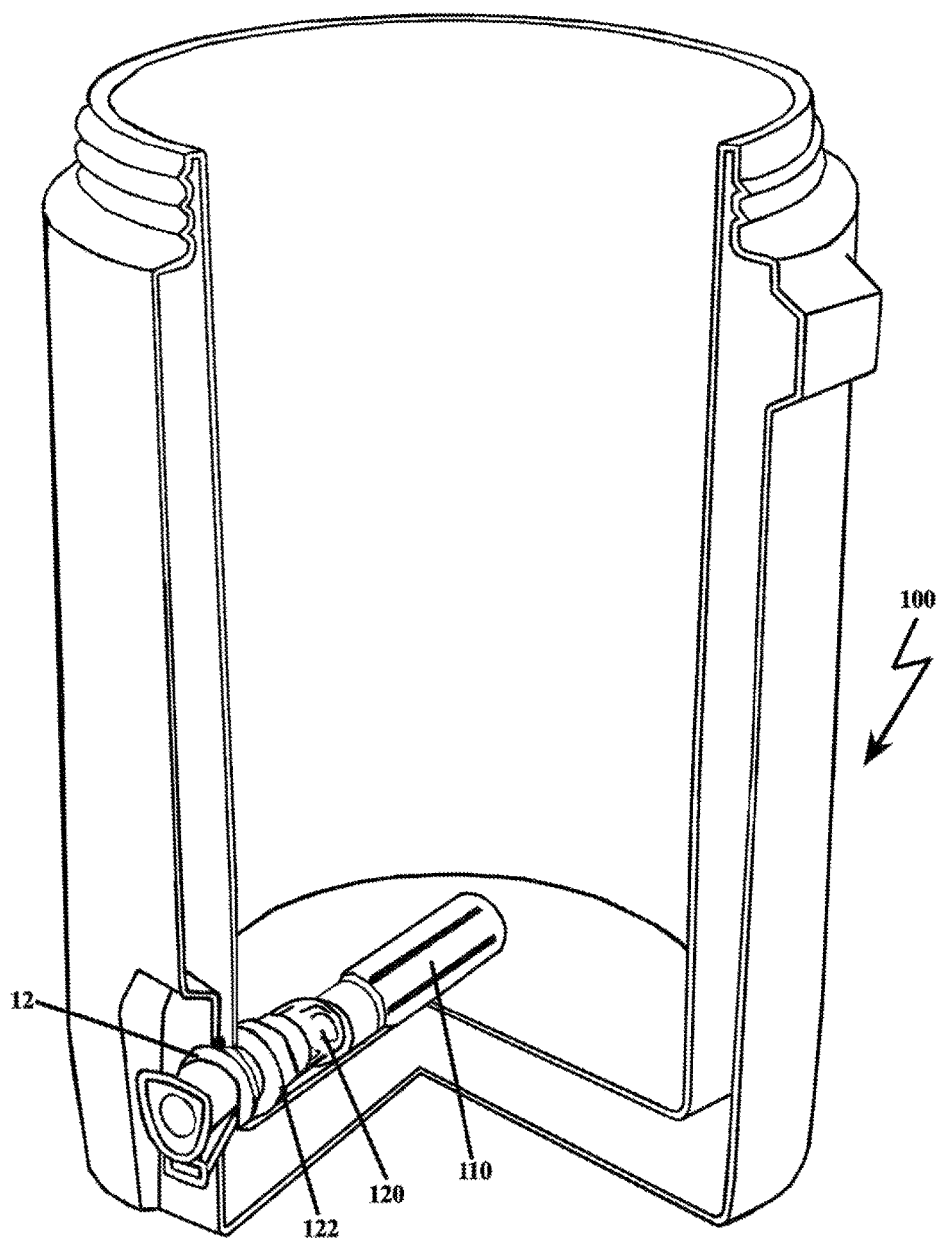
FIG. 6 depicts a cutout sectional view of a jug container having a cylindrical filter cartridge extended from the spigot junction interface by flexible tubing.

FIG. 6 depicts a cutout sectional view of a jug container 100 having a cylindrical filter cartridge 110 extended from the spigot junction interface by flexible tubing 120. Flexible tubing 120 is press fitted on a first end to the spigot junction interface represented by adapter 122 and on a second end to the neck portion 112 cylindrical filter cartridge 110. Using a flexible tubing connection, the filter cartridge rests on the jug liner's bottom surface, which allows for access to water at the bottom of the jug. The press fit of the flexible tube provides for quick installation and removal of the filter cartridge.

Figure 7:
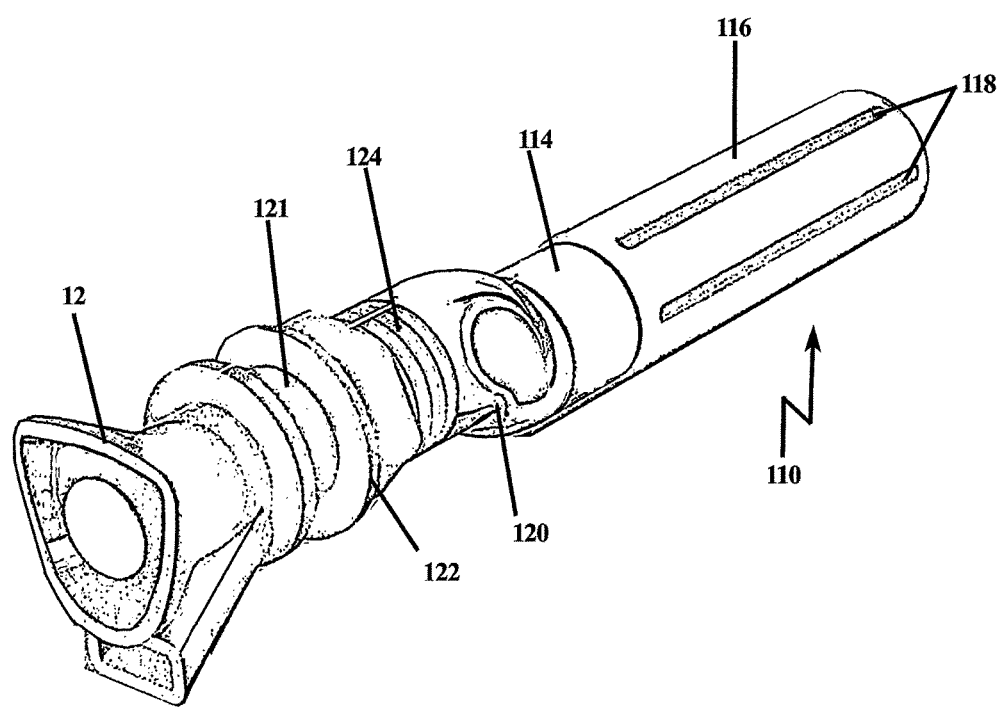
FIG. 7 depicts a perspective view of the cylindrical filter cartridge with flexible tubing of FIG. 6.

FIG. 7 depicts a perspective view of the cylindrical filter cartridge with flexible tubing of FIG. 6. Flexible tubing 120 may be any predetermined length, and will allow filter cartridge 110 to be placed anywhere within the bottom of jug container 100. Spigot 12 is sealingly engaged to adapter 122. The engagement of adapter 122 to spigot 12 opening inside jug 100 is a fluid-tight seal to ensure unfiltered water does not enter the egress line of the spigot without first being filtered. Adapter 122 includes a securable rotatable attachment for threaded engagement with spigot threaded portion 121, and further includes a tubular extended portion 124 to facilitate a press, friction fit to the flexible tubing 120. Similarly, filter cartridge 110 includes neck portion 114 and a base portion 116 that encompasses filter media therein. Base portion 116 is preferably a cylindrically shaped structure having apertures 118 axially placed along its outer surface to allow fluid to enter and come in contact with the filter media secured therein. The flexible tubing may be of various predetermined lengths to accommodate different jug sizes.

Figure 8:
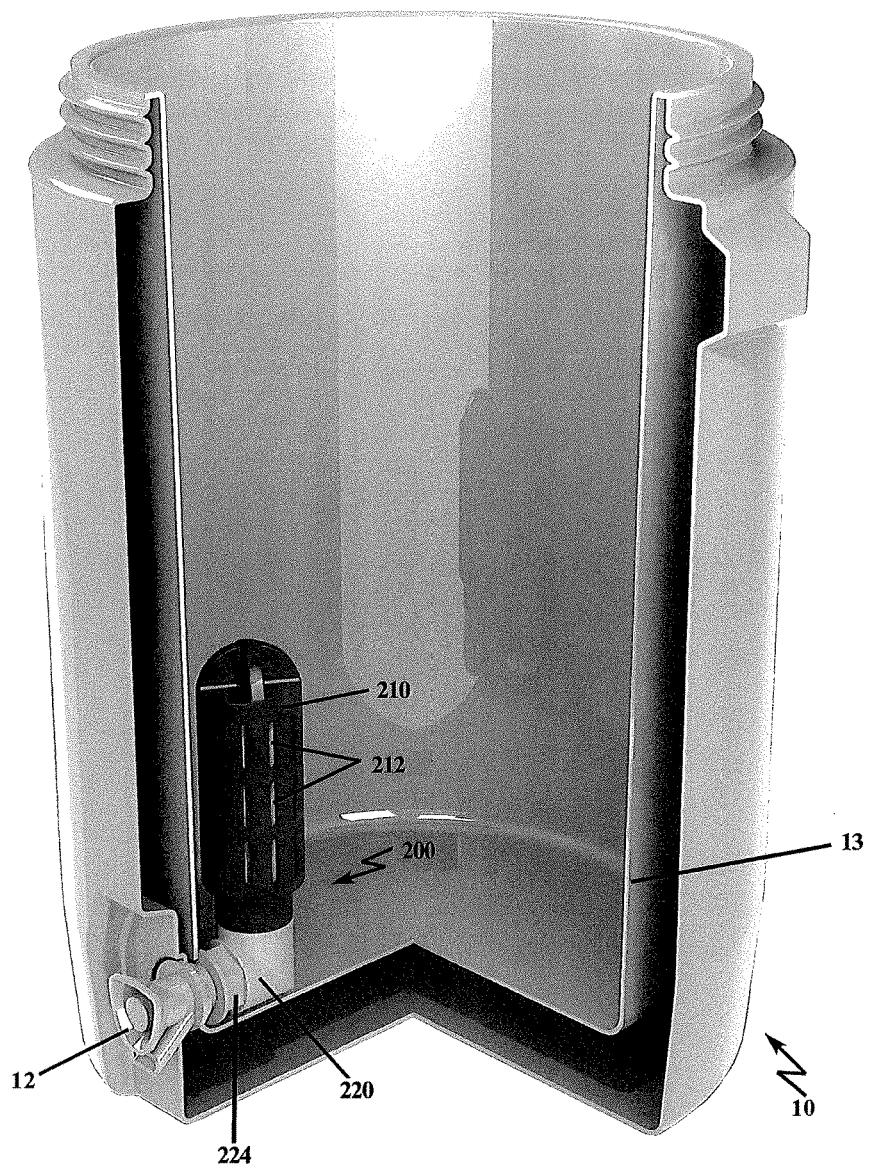
FIG. 8 depicts a cutout sectional view of a jug for containing and dispensing drinkable fluid, and having an angled spigot attachable filter housing assembly for filtering fluid upon egress.

FIG. 8 depicts a cutout sectional view of jug 10 for containing and dispensing drinkable fluid, and having a spigot attachable filter housing assembly 200 for filtering fluid upon egress. Filter housing assembly 200 is similar to filter housing assembly 20 insomuch as it has a neck portion 220 and a base portion 210 that encompasses filter media therein. Base portion 210 is preferably a cylindrically shaped structure having apertures 212 axially placed along its outer surface to allow fluid to enter and come in contact with the filter media secured therein. Unlike the embodiment represented by FIGS. 1 and 2, filter housing 200 has an angled neck portion 220, which is preferably formed at a right-angle allowing base portion 210 to be placed either axially upwards in relation to spigot 12, or horizontal against the bottom surface of jug liner 13. Other angles are not precluded by the design, and angles greater than 90° would allow the filter cartridge to extend further within the cavity of the jug, radially inwards.

Angled neck portion 220 is shown attached to a threaded portion of spigot 12 by a secured, freely rotatable nut 224. This attachment scheme may also be accomplished by a friction, snap fit, or press fit, and may include resilient seals to maintain a water tight seal.

Figure 9:
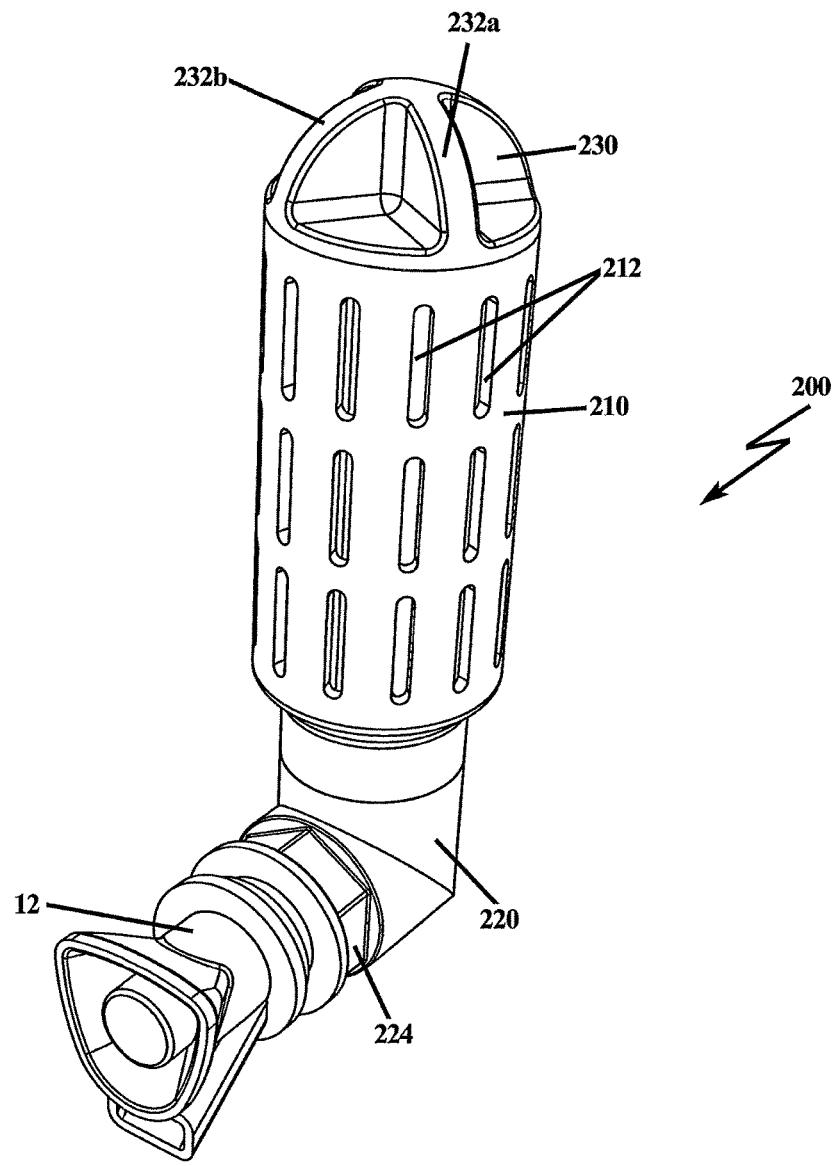
FIG. 9 depicts a side perspective view of the spigot attachable filter housing assembly of FIG. 8 with an angled attachment to a spigot.

FIG. 9 depicts a side perspective view of spigot attachable filter housing assembly 200 with spigot 12. In this position, base portion 210 is mounted vertically or in the axial direction with respect to jug 10. Freely rotatable nut 224 may be loosened to allow base portion 210 to mount horizontally with the bottom of jug filter inner liner 13 if there is sufficient room in the jug to accommodate this rotation. Once rotated, nut 224 is then tightened to secure the filter housing assembly 200 in a fluid tight seal.

As noted in FIG. 9, base portion 210 has attached thereto (or integral therewith) a handle or grip 230 to facilitate the attachment and removal of the filter cartridge from the angled neck portion 220. For exemplary purposes, handle 230 includes two segmented hemispherical ribs 232a,b that join at the center of base portion 210. The interlocking ribs form indented seats for finger placement, which enables a user to rotate easily the filter cartridge into place. Other handle designs, such as handles 307, 407 discussed herein, may be employed, and any specific grip that facilitates the user's grasp and/or rotation of the filter cartridge is not precluded by the present invention.

Figure 10:
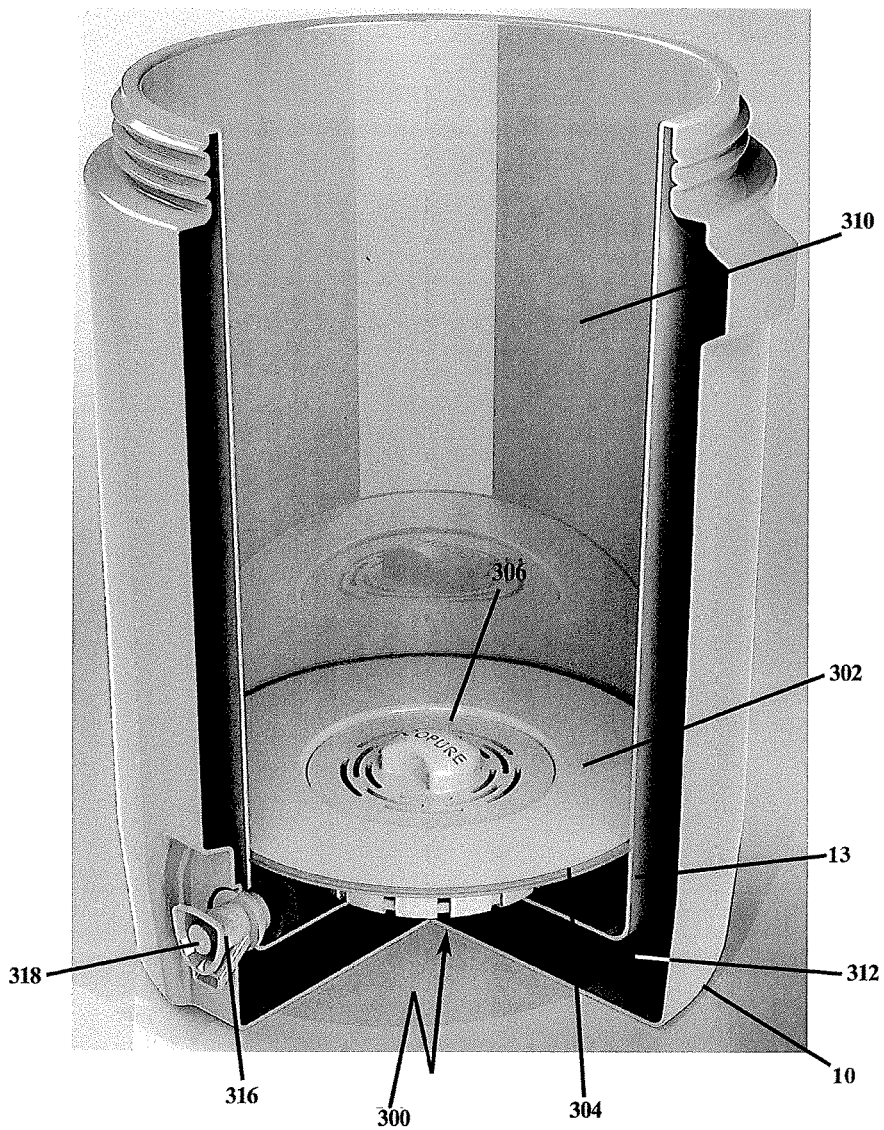
FIG. 10 depicts a saucer filter housing assembly in a jug container, where a disc shaped filter is sealingly mated to the inner liner of the jug by a circumferential resilient seal.

In an alternative embodiment, a saucer or disc shaped filter housing assembly 300 is depicted in a jug container 10, where disc 302 is sealingly mated to inner liner 13 by a circumferential resilient seal 304, as shown in FIG. 10. For a cylindrical container, disc 302 has approximately the same diameter as the inner liner of the container it is in, with just enough room for resilient seal 304 to form a compress fit with the inner liner. This compression fit is designed regardless of the dimensional shape of the container. If the container has a more rectangular cross-section, the saucer filter housing assembly 300 would be rectangular, as well as the resilient seal to form the desired compressed, fluid tight seal. Disc 302 and seal 304 separate the jug cavity into an upper cavity 310 and a lower cavity 312, so that the only path of egress for fluid in upper cavity 310 is through filter cartridge 306. Spigot 316 need not have a mating connector to the filter cartridge in this embodiment. Filtered fluid will enter lower cavity 312 via filter cartridge 306 and remain in lower cavity 312 until a user accesses the fluid by actuating the spigot valve (depicted in FIG. 10 as push-button 318).

Figure 11:
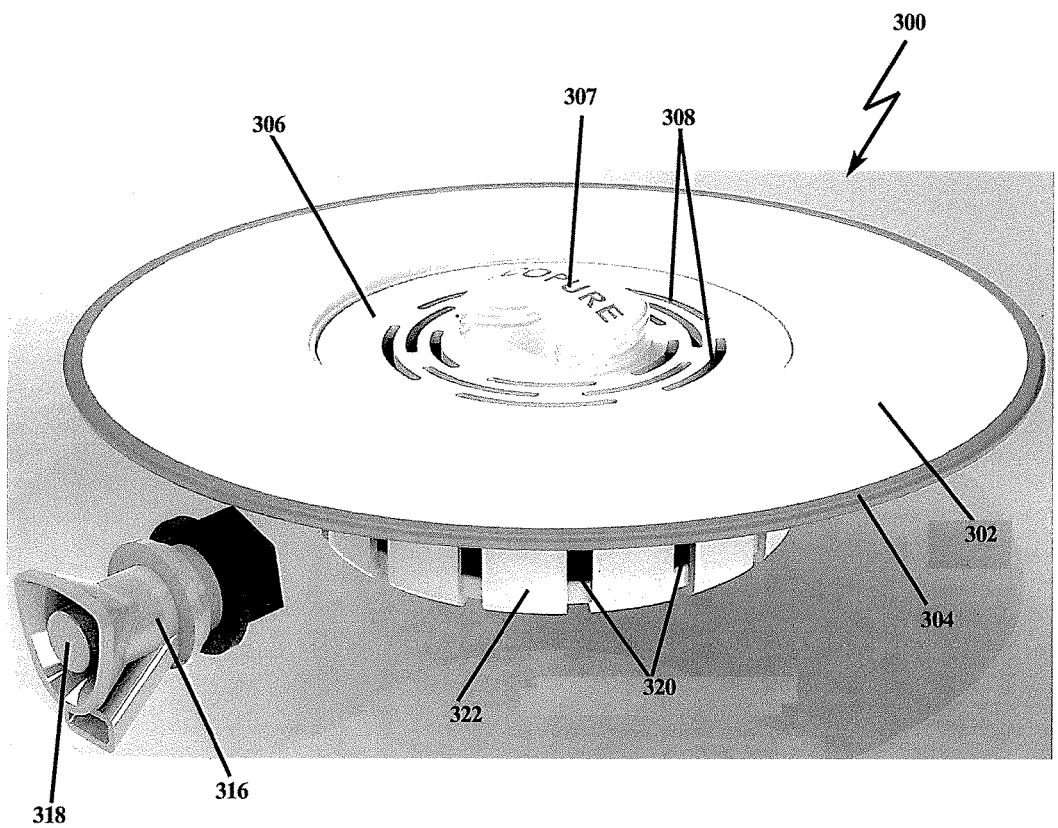
FIG. 11 depicts an exploded, side perspective view of the spigot attachable saucer filter housing assembly of FIG. 10.

FIG. 11 depicts an exploded, side perspective view of the attachable saucer filter housing assembly 300. A removable cover and/or a removable combination cover and filter cartridge 306 is inserted via the top side of housing assembly 300. Filter cartridge 306 includes a handle 307, which allows a user to removably insert the filter cartridge. In a preferred embodiment, filter media is attached to top cover of filter cartridge 306 such that when the top cover is removed by grasping handle 307, a filter media package is removed with it. Replaceable filter media packages may be inserted in the place of the spent filter media package. Apertures 308 are located topside of filter cartridge 306 for fluid ingress to the filter cartridge media. On the underside of saucer filter housing assembly 300, apertures 320 provide for fluid egress after fluid is treated by the filter cartridge. A grated cylindrical housing 322, which forms apertures 320, may be attached to, or integral with, filter housing assembly 300, such that the slotted cylindrical housing may be removable when a user lifts handle 307 to remove filter cartridge 306. Conversely, a slotted housing may be attached to, or integral with, the underside of disc 302, which would remain attached when filter cartridge 306 is replaced. Filter cartridge 306 may be removably inserted by a quarter-turn thread for ease of replacement.

As depicted in FIG. 11, there is no need for spigot 316 to form a physical connection with the filter cartridge housing since filter cartridge assembly 300 separate filtered and unfiltered fluid so that the input port of the spigot (for fluid egress from the spigot) is always situated in a filtered fluid basin.

Figure 12:
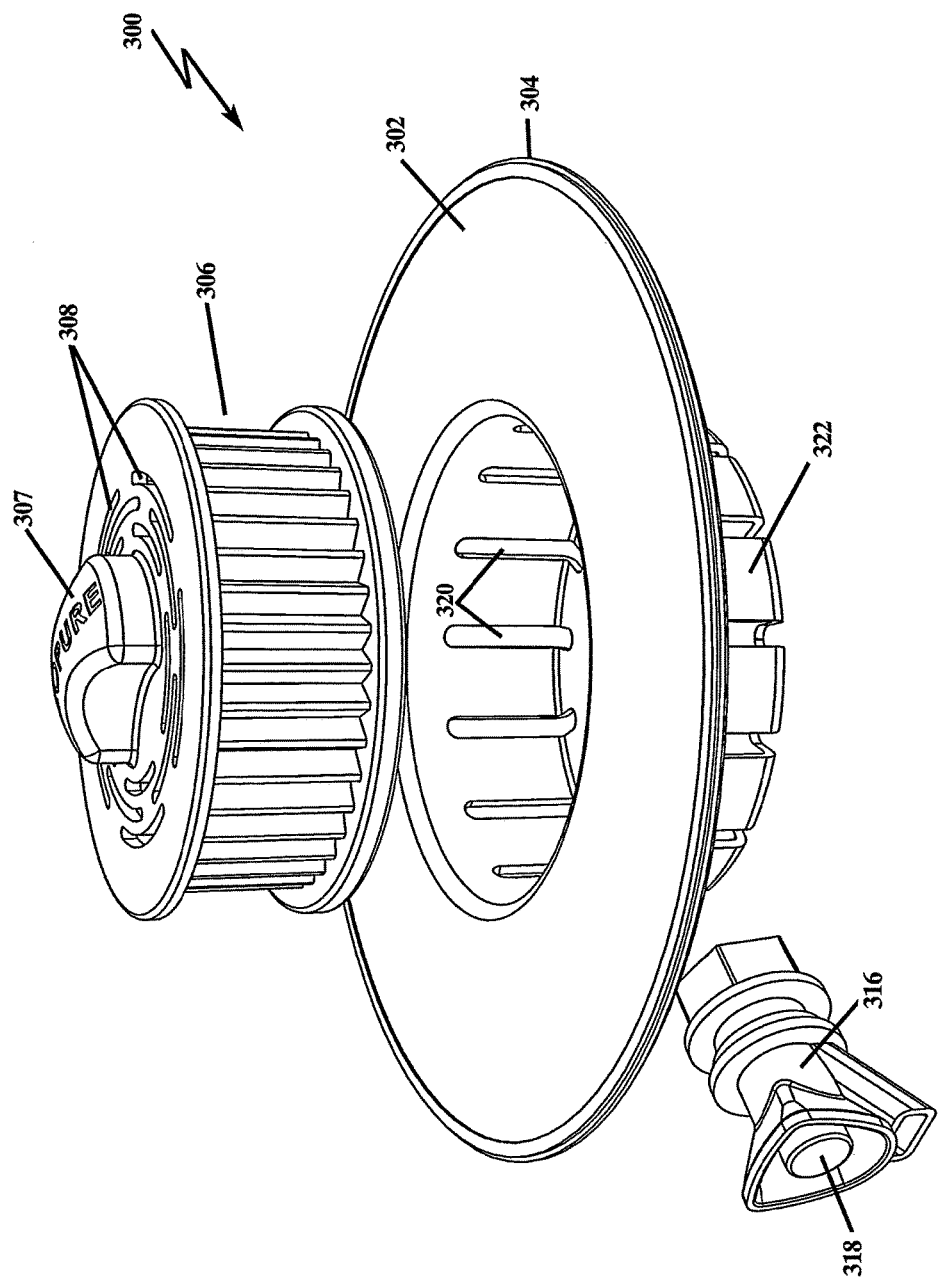
FIG. 12 depicts an exploded, side perspective view of the spigot attachable saucer filter housing assembly with filter cartridge removed from the disc or saucer housing.

FIG. 12 depicts an exploded, side perspective view of the attachable saucer filter housing assembly 300 with filter cartridge 306 removed from disc 302.

Figure 13A:
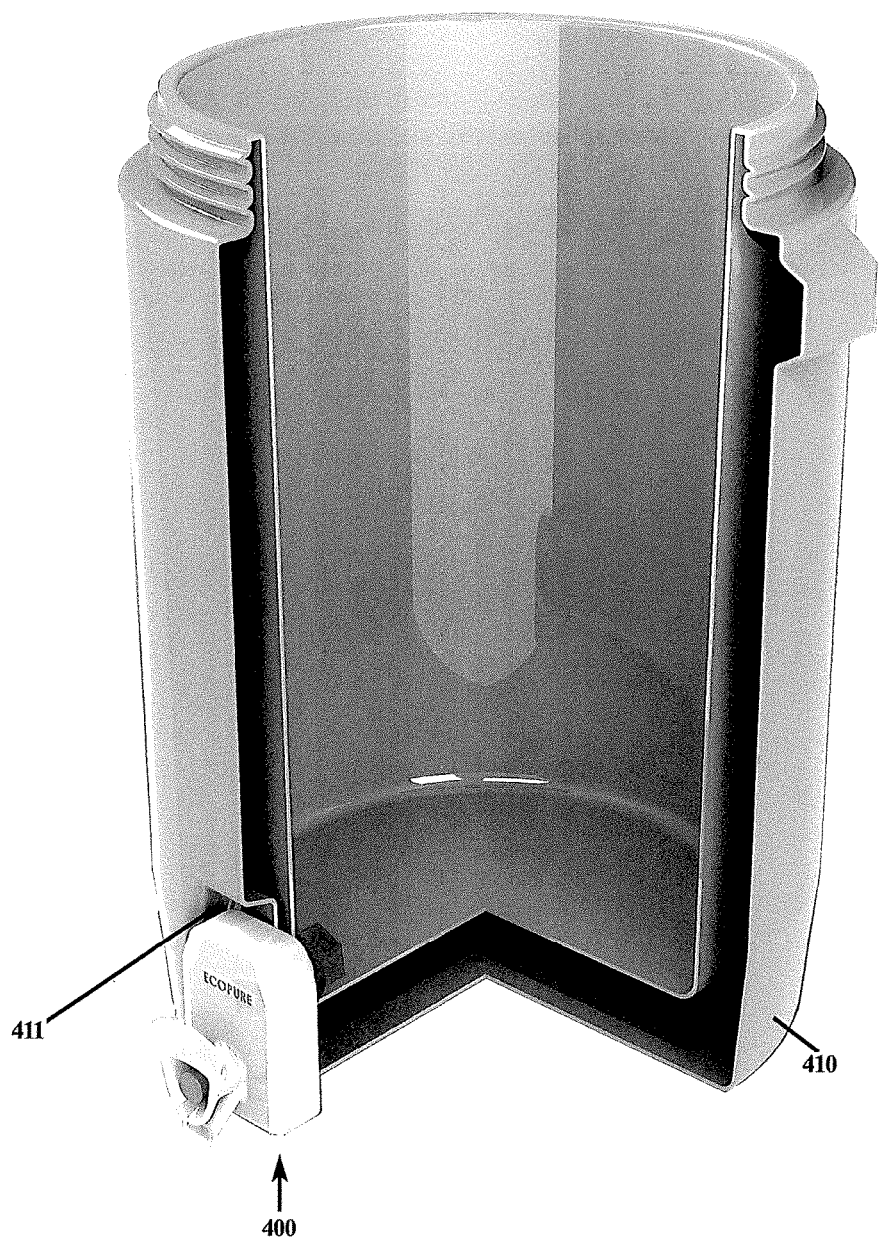
FIG. 13A depicts a cassette cartridge filter housing that is preferably mounted to the outside of jug container.

FIG. 13A depicts a cassette cartridge filter housing assembly 400 that is preferably mounted to the outside of jug container 410. The outside surface of jug container 410 preferably includes an indented portion 411 to receive at least partially filter housing assembly 400.

Figure 13B:
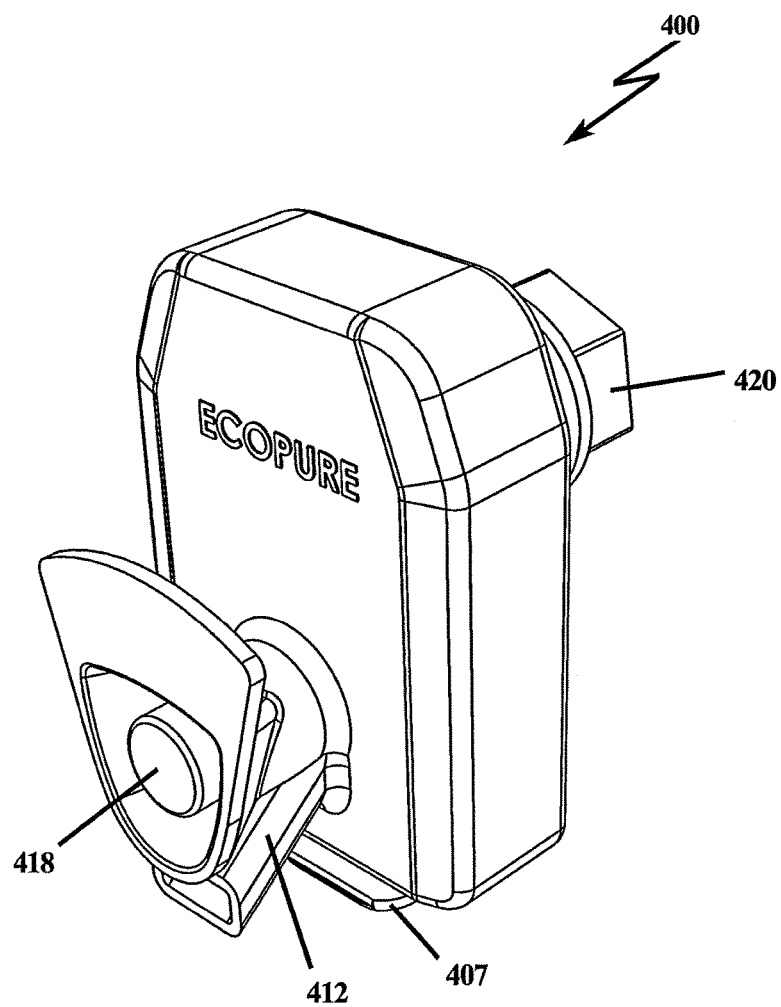
FIG. 13B depicts a perspective view of cassette cartridge filter housing assembly of FIG. 13A.

FIG. 13B depicts a perspective view of cassette cartridge filter housing assembly 400. Filter media is slideably insertable within cassette cartridge housing filter assembly 400. A formed handle 407 may be employed to remove the cartridge from the cassette filter housing assembly 400. Employing the filter cartridge on the outside of the container allows the user to extract all fluid out of the spigot that can possibly be extracted since there is no raised filter component within the container that would isolate fluid lower than the filter housing. Any fluid capable of exiting the spigot orifice will be filtered. A securing nut 420 is located on the inner liner wall of the jug filter cavity to attach cassette cartridge housing filter assembly 400 as depicted in FIG. 13A. Fluid enters through the center of securing nut 420 and complimentary post, and passes through filter media in the cassette cartridge filter located on the outside of the container to spigot 412 upon activation of the spigot valve 418.

Figure 13C:
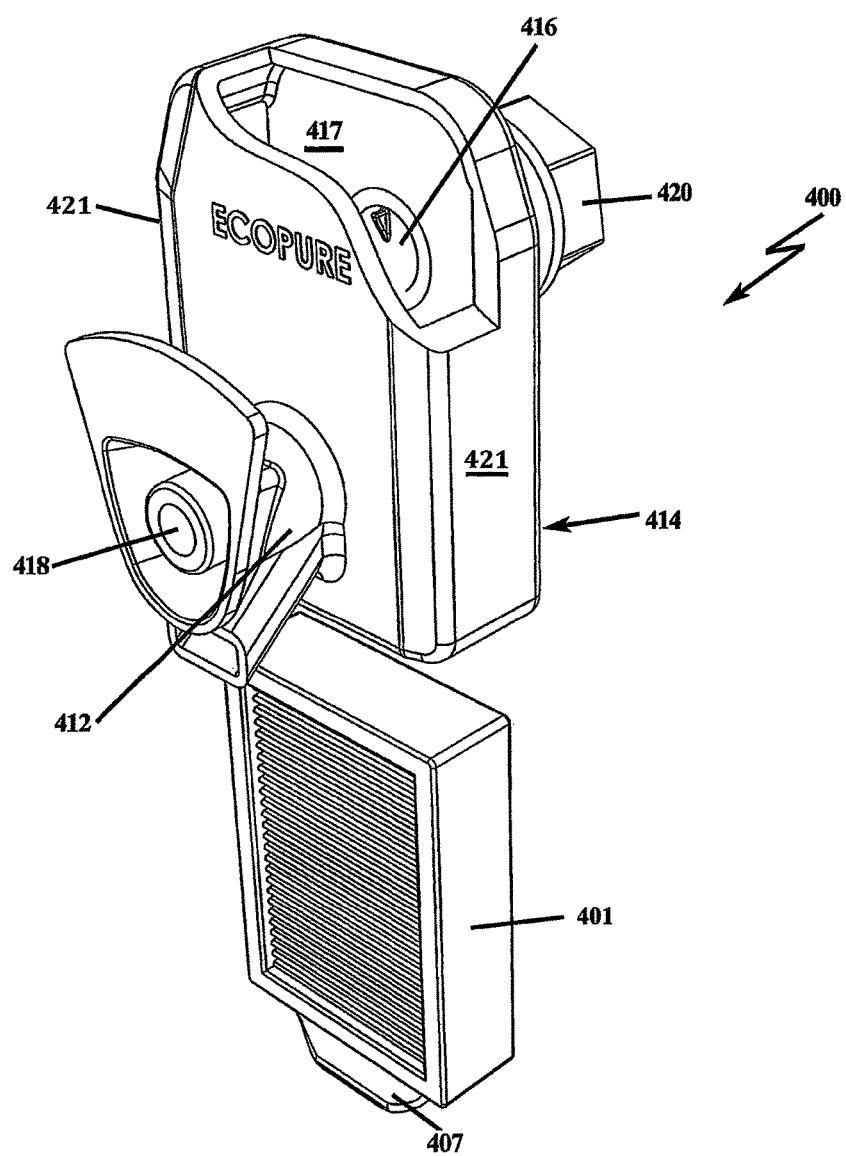
FIG. 13C depicts an exploded, cutaway view of cassette cartridge housing filter assembly of FIG. 13A, wherein the filter cartridge slides within cassette cartridge housing body, and is removable via a handle.

FIG. 13C depicts an exploded, cutaway view of cassette cartridge housing filter assembly 400. Filter cartridge 410 slides within cassette cartridge housing body 414, and is removable via handle 407. Ingress fluid will flow from the center of securing nut 420, through aperture 416 and into filter cartridge 410. Filter cartridge 410 is in sealing communication with the back wall 417 or side walls 421 or front wall of cassette cartridge housing body 414, or any combination thereof, in order to ensure that unfiltered fluid is unable to reach the spigot valve without having first passed through filter cartridge 410.

Having a cassette cartridge and housing on the outside of the container provides another opportunity for labeling the filter assembly, including adding name brand markings if desired, and/or providing labels for safety and performance.

Figure 14A:
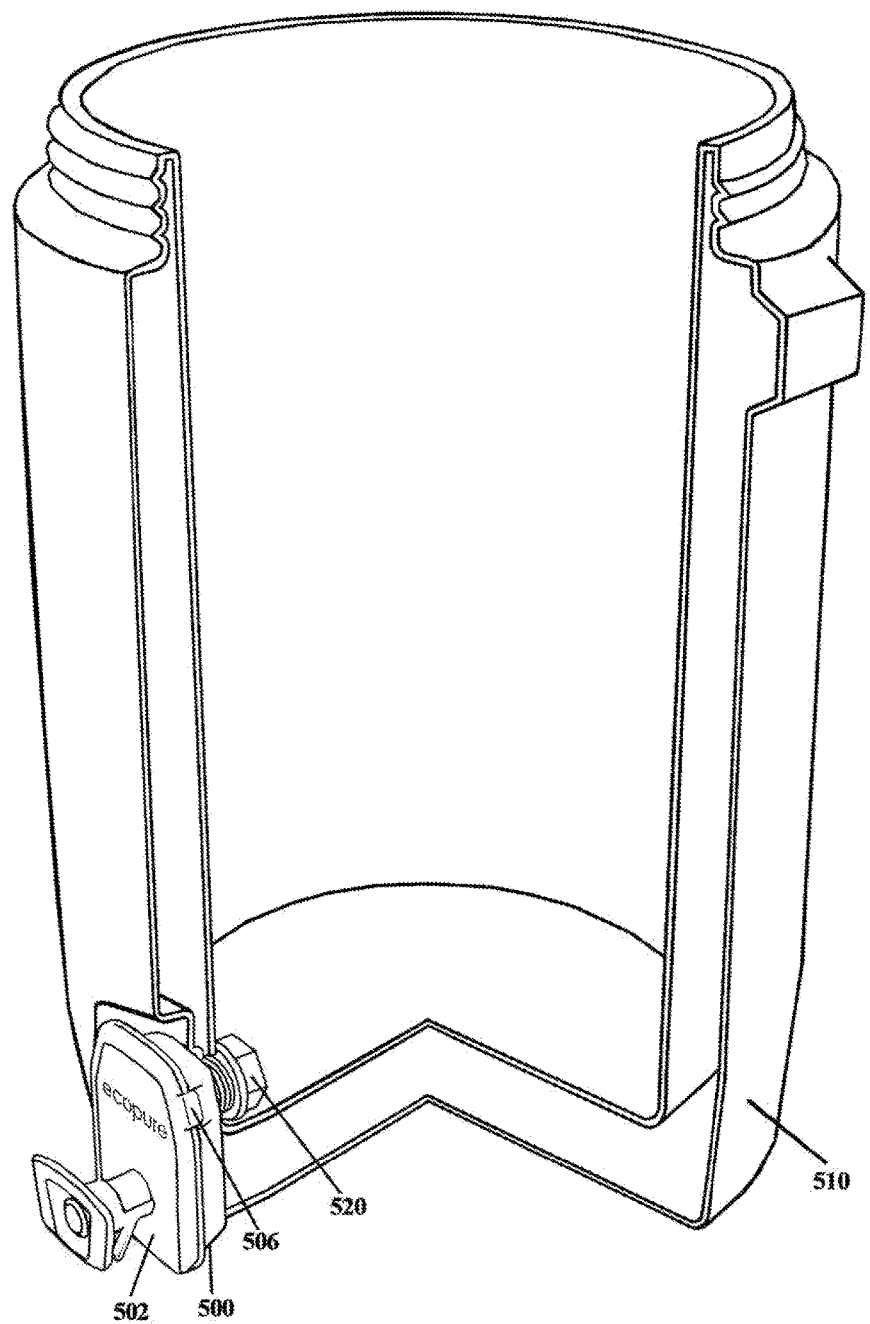
FIG. 14A is a cutaway view of a jug filter having cassette filter cartridge housing with a hinged cover plate.

In a second cassette filter cartridge embodiment, cassette cartridge housing 500 includes a hinged cover plate 502 for access to and replacement of the filter cartridge. FIG. 14A is a cutaway view of a jug filter 510 having cassette filter cartridge housing 500 attached thereto via a securing nut 520, in a similar fashion as cassette filter housing assembly 400. Cover plate 502 is held in place by a hand actuated tab 506.

Figure 14B:
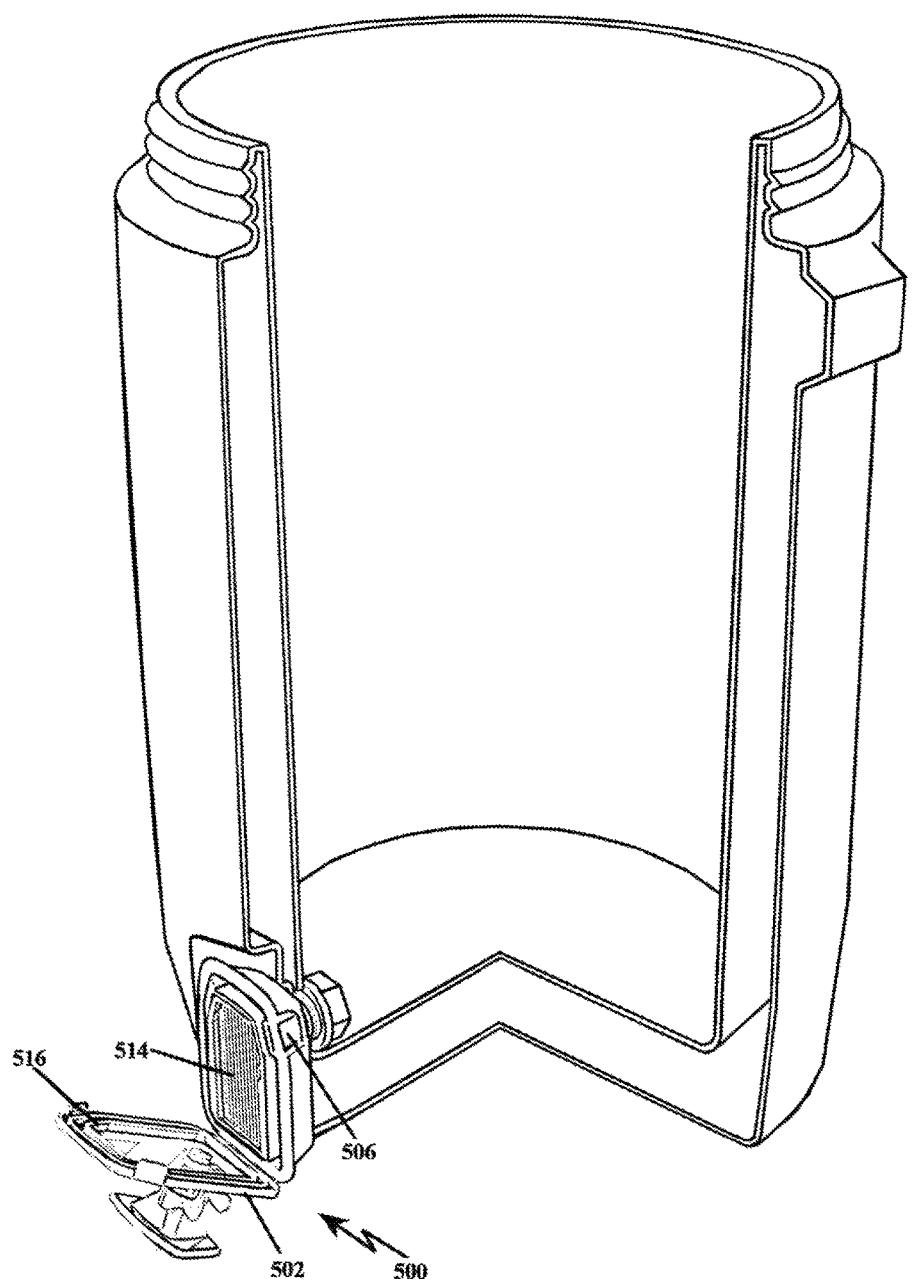
FIG. 14B depicts the cassette cartridge housing of FIG. 14A with the cover plate in an open position, exposing filter cartridge.

Cover plate 502 is hinged such that upon opening, filter cartridge 514 is easily retrievable. FIG. 14B depicts cassette cartridge housing 500 with cover plate 502 in an open position, exposing filter cartridge 514. In this exemplary embodiment, the side of cover plate 502 that faces filter cartridge 514 includes grooves 516 for securing filter cartridge 514 in a sealing fashion. Grooves 516 preferably include a resilient seal, such as a rubber gasket to ensure fluid cannot exit the spigot without first traversing through filter cartridge 514.

The present invention presents a plurality of embodiments for jug filter designs that enable unfiltered fluid to be filtered upon exit of the container. The filtering is performed by a filter cartridge mounted to the extended post of a spigot that extends through the container liner.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A filter assembly for a container comprising:
   a fluid dispensing spigot having a portion located on the outside of said container, and an extension extending therethrough, such that said spigot is in fluid communication with fluid within said container; and
   a cylindrical filter housing rotatably attached to said spigot extension, having an outer diameter and a cylindrical filter media enclosed therein, said cylindrical filter media coaxial with said spigot extension, a body portion having a narrow neck portion coaxial with said cylindrical filter housing that reduces the outer diameter of said cylindrical filter housing and forms a housing egress end, said egress end forming a fluid-tight seal with said spigot extension, said body portion having a plurality of apertures axially aligned on an outer surface of said cylindrical filter housing for fluid ingress to said filter media.
2. The filter assembly of claim 1 wherein said housing egress end forms said fluid-tight seal with said spigot extension by a threaded fit, press fit, snap fit, or friction fit.
3. The filter assembly of claim 1 wherein said container is a jug having an inner cavity, and said filter housing is located within said inner cavity and connected to said spigot extension in a fluid tight seal.
4. The filter assembly of claim 1 wherein said filter media includes pleated paper of fibrillated fibers.
5. The filter assembly of claim 1 wherein said filter media includes extruded carbon.
6. The filter assembly of claim 1 including an adapter for connecting said housing egress end to said spigot extension.

7. The filter assembly of claim 6 wherein said adapter includes a threaded interface for making a fluid tight attachment of said adapter to said spigot extension.

8. The filter assembly of claim 6 including a press fit or friction fit interface for making a fluid tight attachment of said adapter to said housing egress end.

9. A filter assembly for a container comprising:
a fluid dispensing spigot having a portion located on the outside of said container;
an extension member connected to or integral with said spigot, and extending through a wall of said container and into said container such that said spigot is in fluid communication with fluid within said container; and
a filter housing assembly having a right-angled neck portion forming a right-angle with respect to said extension member at a first end and a cylindrical base portion at a second end having an outer surface, said neck portion having said first end coaxial with said extension member and secured by a freely-rotatable nut, and forming a fluid-tight seal with said spigot extension member at said first end, and having said second end coaxial with and forming a fluid-tight seal with said cylindrical base portion at said second end, said base portion in fluid communication with said neck portion second end, and having a plurality of apertures axially aligned on said outer surface of said cylindrical base portion for fluid ingress to filter media enclosed within said filter housing, and having a gripping structure at a top end of said cylindrical base portion for facilitating rotation of said cylindrical base portion with respect to said right angled neck portion second end.

10. The filter assembly of claim 9 wherein said angled neck portion locates said base portion perpendicular from said spigot extension.

11. The filter assembly of claim 9 wherein said angled neck portion forms an angle with said base portion and said spigot extension within a range of 0° to 90°.

12. The filter assembly of claim 9 wherein said filter housing comprises a predominantly cylindrical shape.

13. A filter assembly for a container having a predetermined inside cavity shape, said container comprising:
a fluid dispensing spigot having a portion located on the outside of said container;
an extension member connecting to or integral with said spigot, extending into said container, such that said spigot is in fluid communication with fluid within said container; and
a filter housing assembly having a base portion with a circumferential shape approximately the same as said inside cavity shape, and a filter cartridge removably insertable within said base portion, said base portion having a predominately flat surface extending circumferentially about an inner liner of said container, and forming a fluid-tight seal with said inner liner, such that unfiltered fluid remains above said base portion and can only enter below said base portion through said filter cartridge, and said filter cartridge housing assembly remains physically unattached to said spigot, but remains in mechanical communication with; said spigot or said spigot extension member via said inner liner.

14. The filter assembly of claim 13 wherein said removable filter cartridge includes a removable top cover for accessing filter media.

15. The filter assembly of claim 14 wherein said removable top cover physically connects to said filter media, such that when said top cover is removed from said base portion, said filter media is removed concurrently therewith.

16. The filter assembly of claim 13 wherein said inside cavity shape and said filter housing assembly each has a circular circumference.

17. The filter assembly of claim 13 wherein said filter cartridge includes a predominately circular circumference.

18. A filter assembly for a container comprising:
a removable fluid dispensing spigot located on the outside of said container;
an extension member connecting to or integral with said spigot, extending into said container, such that said spigot is in fluid communication with fluid within said container; and
a filter housing assembly having a base enclosing filter media, said base in fluid communication with said spigot through a flexible extension allowing said filter media to be located a distance from said spigot, said base located within said container and forming a housing for said filter media and having a plurality of apertures for fluid ingress to said filter media, wherein said filter housing assembly includes a neck portion coaxial with said filter media, having a first end in a fluid-tight attachment to and/or integral with said base, said neck portion having a second end opposite said first end forming a fluid-tight seal with said flexible extension, said filter media coaxial with said flexible extension where said flexible extension attaches to said base, said base in fluid communication with said neck portion, and having a cylindrical shape.

19. A filter assembly for a container comprising:
a fluid dispensing spigot in combination with a cassette filter housing assembly located on the outside of said container, such that filter media within said filter housing assembly is entirely outside said container, and said spigot is attached to, and in mechanical communication with, said filter housing such that fluid is dispensed directly from said cassette filter housing to said spigot, said combination having an extension into said container, such that said spigot and filter media within said cassette filter housing assembly are in fluid communication with one another.

20. The filter assembly of claim 19 wherein said cassette filter housing assembly includes a slideably removable filter cartridge.

21. The filter assembly of claim 19 wherein said container includes an indented region for at least partially receiving said cassette filter housing assembly.

22. The filter assembly of claim 19 wherein said cassette filter housing assembly includes a securable cover plate for removing and replacing said filter cartridge.

23. The filter assembly of claim 22 wherein said cover plate is hinged on one side and secured at an opposite or adjacent side.

* * * * *

UNITED STATES PATENT AND TRADEMARK OFFICE
CERTIFICATE OF CORRECTION

PATENT NO. : 10,196,282 B2
APPLICATION NO. : 14/610373
DATED : February 5, 2019
INVENTOR(S) : Boudreau et al.

Page 1 of 1

It is certified that error appears in the above-identified patent and that said Letters Patent is hereby corrected as shown below:

In the Specification

In Column 5, Line 60, delete ")" after "openings"

In Column 9, Line 58, delete "410" and substitute therefore --401--

In Column 9, Line 62, delete "410" and substitute therefore --401--

In Column 9, Line 62, delete "410" and substitute therefore --401--

In Column 9, Line 67, delete "410" and substitute therefore --401--

In Column 9, Line 67, after cartridge 401. insert --Additionally, a user never has to touch unfiltered water when replacing the filter cartridge.--

Signed and Sealed this
Sixth Day of August, 2019

Andrei Iancu
*Director of the United States Patent and Trademark Office*